United States Patent
Oelrichs et al.

(10) Patent No.: US 6,298,950 B1
(45) Date of Patent: *Oct. 9, 2001

(54) STEERING ROLLER

(75) Inventors: Günter Oelrichs, Remscheid; Jörg Kirschey, Halver, both of (DE)

(73) Assignee: Rhombus Rollen GmbH & Co., Wermelskirchn (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/430,636

(22) Filed: Oct. 29, 1999

(30) Foreign Application Priority Data

Nov. 18, 1998 (DE) .............................. 198 53 218

(51) Int. Cl.[7] .............................. B60T 1/00; B60B 33/02
(52) U.S. Cl. .............................. 188/20; 188/1.12; 188/25
(58) Field of Search .............................. 188/19, 25, 29, 188/2 D, 1.12, 20, 21; 16/35 R

(56) References Cited

U.S. PATENT DOCUMENTS

| | | | | |
|---|---|---|---|---|
| 2,262,288 | * | 11/1941 | Klipstein et al. | 188/1.12 |
| 2,638,183 | * | 5/1953 | Prowinsky | 188/1.12 |
| 3,237,940 | * | 3/1966 | Johnson | 16/35 R |
| 5,133,106 | * | 7/1992 | Milbredt et al. | 16/35 R |
| 5,184,373 | * | 2/1993 | Lange | 16/35 R |
| 5,261,682 | * | 11/1993 | Chuang | 188/1.12 |

* cited by examiner

*Primary Examiner*—Douglas C. Butler
*Assistant Examiner*—Devon Kramer
(74) *Attorney, Agent, or Firm*—John F. A. Earley; John F. A. Earley III; Harding, Earley, Follmer & Frailey

(57) ABSTRACT

The invention concerns a steering roller having a fork with two legs being spaced apart and a cover, including a brake shoe actuated by a spring loaded pin acting in conjunction with a Bowden cable.

15 Claims, 4 Drawing Sheets ated thereby.

STEERING ROLLER

BACKGROUND OF INVENTION

The invention concerns a steering roller. A steering roller is known from EP 0 484 627 A1. In that steering roller the brake shoe slides permanently on the running wheel. For the user the rolling resistance is increased thereby.

SUMMARY OF INVENTION

It is the object of the invention to provide a steering roller being well adjustable. At least the adjustment of the first two of the following operational positions must be permitted:

A first operational position in which the running wheel is blocked totally, a second operational position in which the running wheel can be moved in all directions without being restricted, and a third operational position in which the running wheel is rotatable but locked in the direction.

This object is resolved by a steering wheel according to claim 1.

For the features relevant for a braking and/or locking position such a steering wheel does not need more than three components, that is said toothed ring, the brake shoe and the bow. All the three components cooperate functionally. The brake shoe and the toothed ring are mounted on said pin, the brake shoe being guided axially by the pin and the toothed ring and being secured against rotational movement by said bow.

While the toothed ring is fixed to the pin and rotates with a rotation of the journal or the carried pin, the position of the brake shoe put loosely onto the pin, for example, rests constant, independent of the turning movement of the journal. However, in a turning of the fork the brake shoe is carried along, according to its function, through the bow engaging the brake shoe and being fixed to the fork.

According to an embodiment the brake shoe is clipped onto the free end of the pin, which requires an appropriate (deformable) material of the brake shoe, which may consist of plastic, for example.

The bow may be attached to the fork by locking, screwing and/or riveting. For constructive reasons the attachment is effected usually in the region of the cover of the fork.

The bow may be realized as a spring, the term "spring" being understood as the bow having a certain resiliency at its free end (below the toothed ring). Said resiliency comes to fruition, when the tooth (teeth) of the toothed ring engages the corresponding opening(s) of the bow in the totally blocked position of the steering roller. Here, a corresponding position of the Bowden cable acting on the pin having been adjusted, the toothed ring attached to the pin is pushed downwardly (towards the running wheel) by the action of the associated spring.

The engagement of the teeth with the openings is aided, if the teeth become narrower towards their free end, that is if they have inclined flanks.

The toothed ring may have at least one catching means on its side opposite the running wheel for engaging a corresponding recess in the region of the cover of the fork. Like a "kinematic reversal" the toothed ring may have at least one recess on its side opposite the running wheel for receiving a corresponding catching means which, then, is disposed in the region of the cover of the fork. The corresponding operational position is adjusted through a corresponding position of the Bowden cable. The pin and with it the toothed ring are moved away (pulled upwardly) from the running wheel against the action of the spring, until the catching means engage the corresponding recesses and this operational condition is stabilized, in which the steering wheel is only able to run straight.

According to this function at least one and at most two catching means and, correspondingly, one or two recesses are sufficient, an arrangement offset by 180 degrees of the catching means and the recesses, respectively, having proved to be convenient.

For example, the brake shoe may consist of a moulded piece having an arcuate braking surface adapted to the running surface of the running roller. In this way, a large braking surface is provided and the braking operation is optimized.

In order to provide an adjustment of the position of the brake shoe with respect to the running roller, an embodiment provides to form the brake shoe as follows:

Like a "triangle", the brake shoe comprises a base leg being situated against the toothed ring, an adjusting leg sticking out at a right angle from one end of the base leg, and a brake leg extending from the other end of the base leg towards the free end of the adjusting leg and having the arcuate braking surface. The free end of the brake leg has a small distance from the free end of the adjusting leg. In this way, the brake leg is deformable about its region of connection to the base leg within the limits of resiliency of the selected material and is thus able to adapt optimally the contour of the running surface of the running wheel.

In addition, that embodiment makes an adjustment of the brake shoe possible, for which a development provides to dispose an adjusting screw in the region of the adjusting leg, the free end of which is situated against the surface of the brake leg facing the base leg and which thus pushes it towards the running surface of the running wheel.

In the embodiment mentioned above a lock against turning between the bow and the brake shoe may be effected, for example, in that the bow has a projecting tongue on its free end, which engages a corresponding recess of the brake shoe.

The Bowden cable, a first end of which is attached to the upper end of the pin, is to be able to be locked in at least two positions, that is the first two operational positions mentioned and described above.

The Bowden cable which may be actuated at its second end may occupy the third operational position mentioned and described above, if the corresponding mutual recesses and catching means engage on the side of the toothed ring, opposite the running wheel.

The Bowden cable may be operated like a gear shifting for bicycles and be locked in the desired position (operational position) or released again. Only a small effort is required for that. The actuation means at the second end of the Bowden cable may be designed in such a manner that several running wheels, for example four running wheels on a hospital bed, may be acted on at the same time.

Further characteristics of the invention follow from the features of the subclaims as well as the other application documents.

The invention is described below with an embodiment.

DETAILED DESCRIPTION OF THE DRAWINGS

Figure 1:
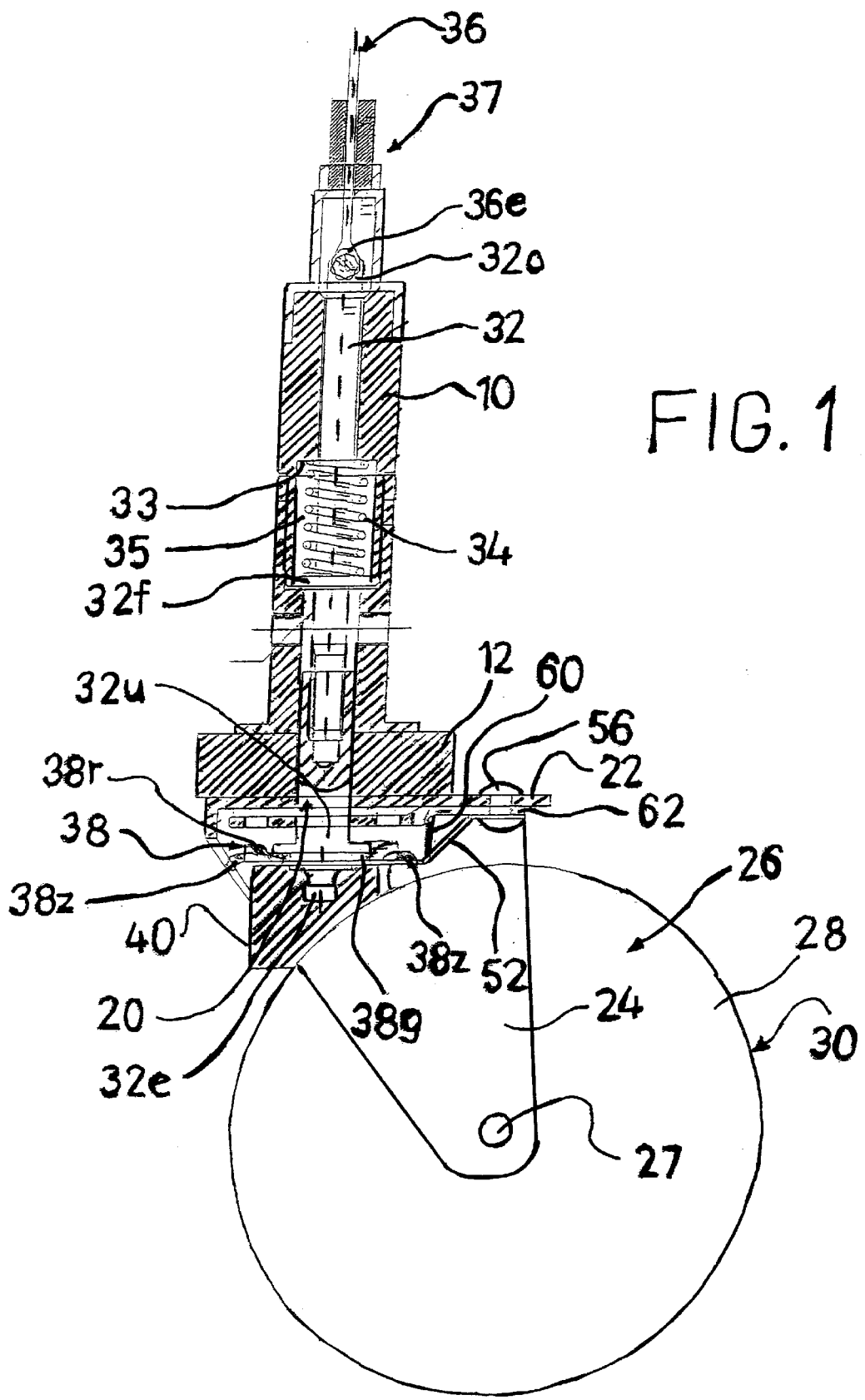
FIG. 1 a partial longitudinal section through a steering roller in a first operational position, FIG. 2 a partial longitudinal section through a steering roller in a second operational position, FIG. 3 a partial longitudinal section through a steering roller in a third operational position, FIG. 4 an enlarged sectional view of the brake shoe of the steering wheel according to FIGS. 1 to 3, FIG. 5 a view of the brake shoe of the steering wheel according to FIGS. 1 to 3 from below.

The steering roller illustrated in FIG. 1 has the following structure:

It comprises a journal 10, the lower end or which is fixed to a pot-like seat 12.

In the region of the seat 12 the journal 10 is guided in a ball bearing (not illustrated). The ball bearing is bordered by a collar (not illustrated), the lower end of which has a frictional connection to an edge of an opening 20 of a cover 22 which forms a fork 26, together with two legs 24 extending in parallel and being spaced apart.

Each leg 24 has an opening 27 at its lower end. A pin (not illustrated) is guided through the openings 27, which is secured on the outside with respect to the legs 24 and on which a running wheel axle (not illustrated) with a ball bearing and an associated running wheel 28 are disposed, the running surface of which has the reference number 30.

A pin 32 is guided displaceably in axial direction within the journal 10, which can be charged through a pressure spring 34. The spring 34 is supported by a flange 32f of the pin 32 at the lower part and is situated against an annular step 33 of a recess 35 at the upper part, which receives the spring 34.

A first end 36e of a Bowden cable 36 is hinged to the upper end 32o of the pin 32, the cable of which runs upwardly out of a sleeve-like extension 37 of the journal 10 to a shifting member (not illustrated).

The lower end 32u of the pin 32 projects downwards beyond the journal 10 and receives a toothed ring 38, which has a frictional connection to the pin 32. The toothed ring 38 consists of a circular base body 38g and teeth 38z at the periphery, which are bent towards the running wheel 28. Furthermore, two detents 38r (offset at 180 degrees with respect to each other) are formed out of the base body 38g in an upward direction.

A brake shoe 40 of plastic is clipped to the free end 32e of the pin 32 reaching beyond the toothed ring 38, which is situated loosely against the base body 38g of the toothed ring 38 and is secured in the downward direction by an enlarged portion of the pin end 32e.

Figure 4:
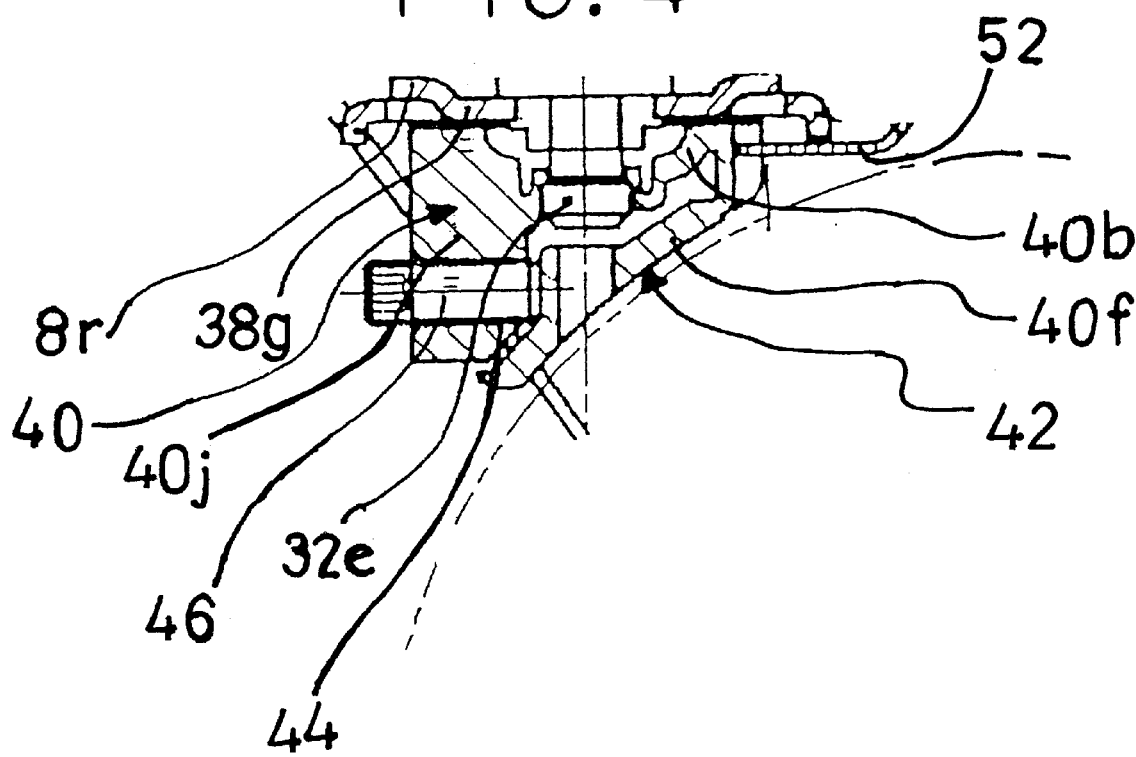

As shown in FIG. 4, the brake shoe 40 consists of a base leg 40b (being situated against the toothed ring 38), an adjusting leg 40j sticking out at a right angle from one end of the base leg, and a brake leg 40f extending from the other end towards the free end of the adjusting leg 40j and having an arcuate braking surface 42 being adapted to the running surface 30. Altogether, a triangle-shaped section geometry of the brake shoe 40 results.

The adjusting leg 40j has an opening 44 in which a headless screw 46 serving as an adjusting screw is guided, the free end of which is situated against the inner surface of the brake leg 40f. By adjusting the adjusting screw 46, the position of the brake leg 40f with respect to the running surface 30 of the running wheel 28 can be adapted according to the degree of wear.

Figure 5:
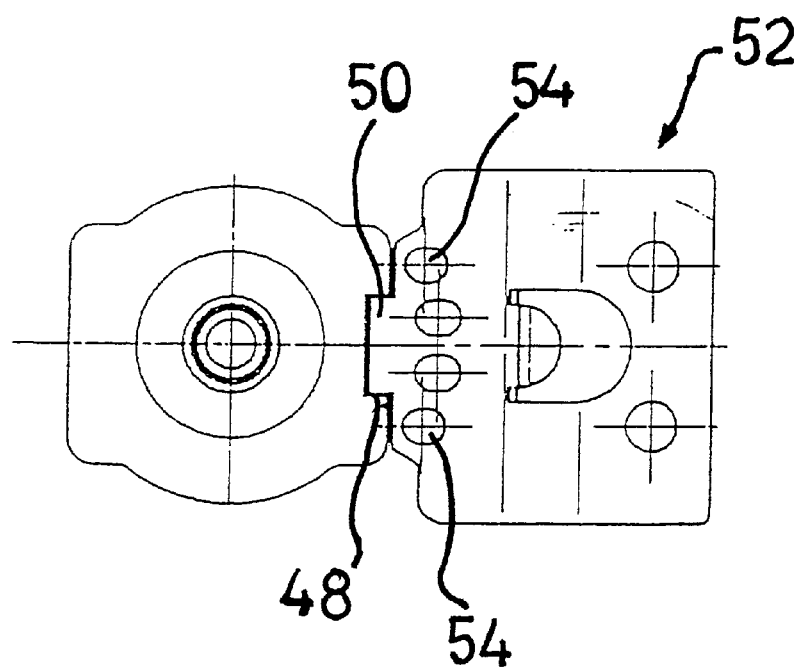

As follows from FIG. 5, the brake shoe 40 has a recess 48 in the region of connection between the base leg 40b and the brake leg 40f, which is engaged by a projection 50 of a bow 52 having several openings (here: four openings) 54 adjacent the projection 50.

The bow 52 is bent at the other end and is there attached to the cover 22 through rivets 56. An additional fastening results by a tongue 60 being formed upwardly out of the bow 52, which reaches behind the plate 62. The plate 62 is also attached to the cover 22 through the rivets 56 in that region and an annular portion 62r of it extends from there about the pin 32. Two recesses being offset at 180 degrees are disposed in the annular portion 62r, that is in correspondence with the detents 38r of the toothed ring 38.

The operation of the steering roller is as follows:

By pulling the cable of the Bowden cable 36 the pin 32 is moved to one of the three operational positions described below and is locked by securing the Bowden cable in that position:

In a position of total locking (FIG. 1) the pin 32 is displaced downwards (towards the running wheel 28) to a maximum by the spring 34. In that position, four teeth 38z project into the corresponding openings 54 of the bow 52, a lock against turning being provided thereby. At the same time, the brake shoe 40 is displaced downwards to a maximum and its braking surface 42 is situated against the running surface 30 of the running wheel 28. The running wheel is not longer able to rotate about its axis and is also not longer able to be turned about the pin 32.

Figure 2:
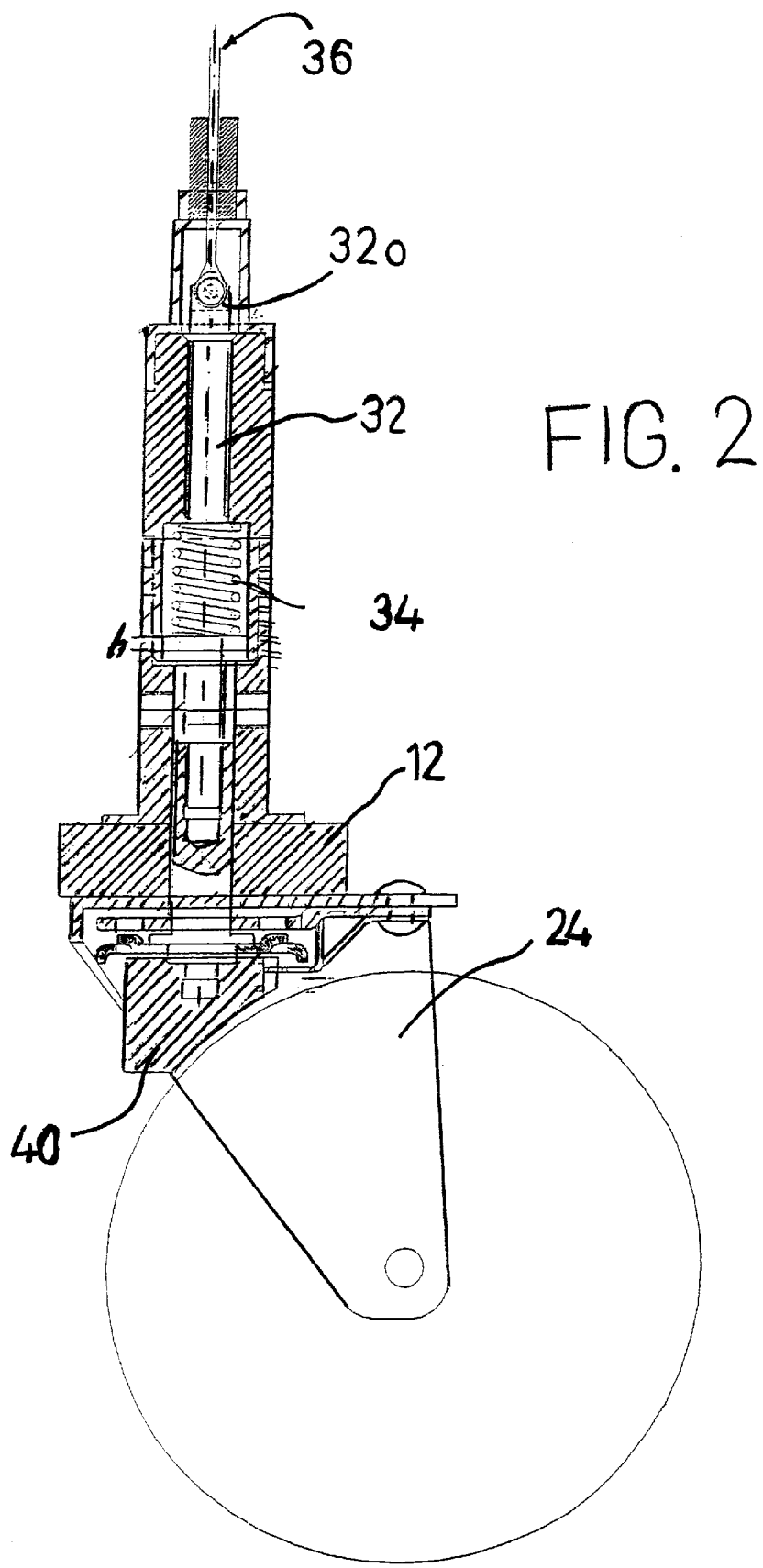

FIG. 2 shows the second position in which the Bowden cable 36 has been pulled upwards for a little length (length h) and has been locked, and in which the pin 32 is in a correspondingly "raised" position. Here, neither the detents 38r are in engagement with the recesses of the plate 62 nor the teeth 38z are engaged in the openings 54. Also, the braking surface 42 is spaced apart from the running surface 30.

Accordingly, the steering roller may be rotated about its axis as well as be turned about the pin 32.

Figure 3:
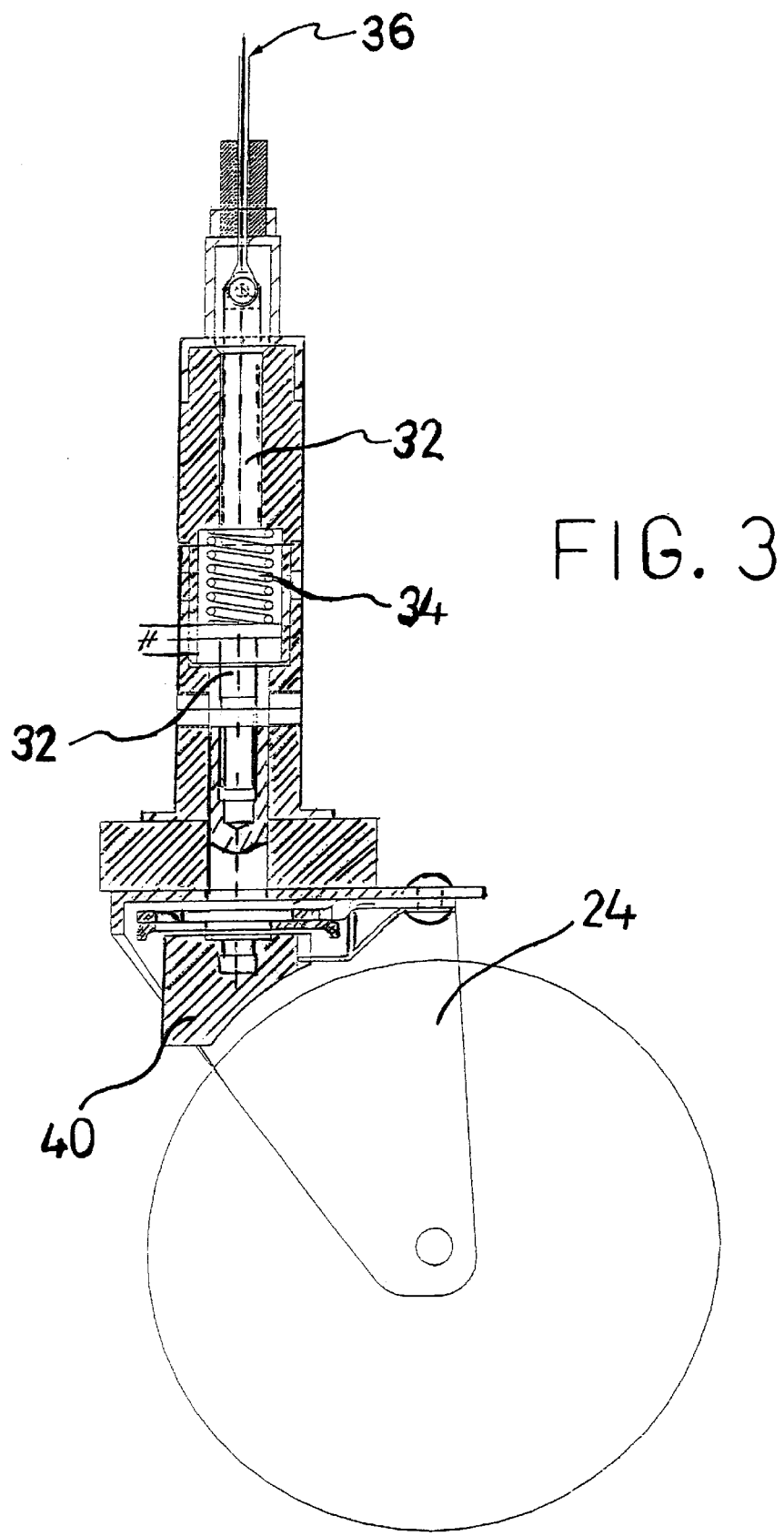

In a third position of the Bowden cable 36 (FIG. 3), the pin 32 has a maximal distance from the running wheel 28 and the Bowden cable 36 has been pulled for a distance H. Accordingly, the braking surface 42 is released with respect to the running surface 30 and the detents 38r of the toothed ring 38 are in engagement with the corresponding recesses of the plate 62. In that position, the running wheel 28 may rotate about its axis but is not longer able to move about the pin 38. For example, a hospital bed equipped with the described steering rollers may be driven straight with more ease thereby.

What is claimed is:

1. A steering roller having:
   a fork (26) with two legs (24) being spaced apart and a cover (22) connecting said legs (24),
   a running wheel (28) running rotatably on bearings between the legs (24) of the fork (26), wherein
   the fork (26) being guided rotatably on a journal (10) joined to the cover (22),
   a pin (32) being guided within the journal (10) in an axially spring-loaded manner, a lower end (32u) of which projects beyond the cover (22) and has means for locking the fork (26), and an upper end (32o) of which can be acted on in an axial direction, and
   a toothed ring (38) being fixed by frictional connection to the lower end (32u) of the pin (32), said toothed ring having at least one tooth (38z) pointing towards the running wheel (28)
   characterized by the following features:
   a brake shoe (40) is disposed in an axially secured manner on a free end (32e) of the pin (32) projecting downwards beyond the toothed ring (38), the brake shoe (40) is held locked against turning with respect to the pin (32) by a free end (50) of a bow (52), the bow (52) has at least one opening (54) formed correspondingly for receiving at least one tooth (38z) of the toothed ring (38) and its other end is attached to the fork (26), the pin (32) is arranged to be actuated axially by a Bowden cable (36) hinged to its upper end (32o).

2. The steering roller according to claim 1, wherein the brake shoe (40) is clipped to the free end (32e) of the pin (32).

3. The steering roller according to claim 1, wherein the bow (52) is attached to the fork (26) by locking, screwing or riveting (56).

4. The steering roller according to claim 1, wherein the bow (52) is realized as a spring.

5. The steering roller according to claim 1, wherein the toothed ring (38) has at least one catching means (38r) on its side opposite the running wheel (28) for engaging a corresponding recess in the region of the cover (22) of the fork (26).

6. The steering roller according to claim 1, wherein the toothed ring (38) has at least one recess on its side opposite the running wheel (28) for receiving a corresponding catching means in the region of the cover of the fork.

7. The steering roller according to claim 5, wherein two catching means (38r) and two recesses are provided, which are disposed diametrically opposite each other.

8. The steering roller according to claim 1, wherein the brake shoe (40) consists of a moulded piece having an arcuate braking surface (42) corresponding to a running surface (30) of the running wheel (28).

9. The steering roller according to claim 8, wherein the brake shoe (40) has a base leg (40b) being arranged against the toothed ring (38), an adjusting leg (40j) sticking out at a right angle from one end of the base leg (40b), and a brake leg (40f) extending from a other end of the base leg (40b) towards a free end of the adjusting leg (40j) and having said arcuate braking surface (42).

10. The steering roller according to claim 9, wherein the brake leg (40b) is formed resiliently.

11. The steering roller according to claim 9, wherein an adjusting screw (46) being directed towards the brake leg (40f) reaches through the adjusting leg (40j).

12. The steering roller according to claim 1, wherein the Bowden cable (36) is arranged to be locked in at least two positions, a first position in which at least one tooth (38z) of the toothed ring (38) projecting towards the running wheel (28) engages at least one opening (54) of the bow (52), and a second position in which none of the teeth (38z) engages one of the openings (54).

13. The steering roller according to claim 12, wherein the Bowden cable is arranged to be locked in a third position in which corresponding mutual recesses and catching means on that side of the toothed ring (38) opposite the running wheel (28) are in engagement.

14. The steering roller according to claim 1, wherein the Bowden cable (36) is arranged to be locked in and released from several positions like a gear shifting.

15. The steering roller according to claim 6, wherein two catching means (38r) and two recesses are provided, which are disposed diametrically opposite each other.

* * * * *